United States Patent
Cowman et al.

(10) Patent No.: US 6,334,964 B1
(45) Date of Patent: Jan. 1, 2002

(54) VARISTOR INK FORMULATIONS

(75) Inventors: Stephen P. Cowman, Co. Louth (IE); Derek A. Nicker, Great Yarmouth; John M. Shreeve, Norwich, both of (GB)

(73) Assignee: Littelfuse, Inc., Des Plaines, IL (US)

( * ) Notice: Subject to any disclaimer, the term of this patent is extended or adjusted under 35 U.S.C. 154(b) by 0 days.

(21) Appl. No.: 09/353,567

(22) Filed: Jul. 14, 1999

Related U.S. Application Data

(62) Division of application No. 08/384,805, filed on Feb. 6, 1995, now Pat. No. 5,973,588, which is a continuation of application No. 08/206,251, filed on Mar. 4, 1994, now abandoned, which is a continuation of application No. 07/543,528, filed on Jun. 26, 1990, now abandoned.

(30) Foreign Application Priority Data

Mar. 16, 1990 (GB) ............................................. 9005991

(51) Int. Cl.⁷ ................................................. H01B 1/00
(52) U.S. Cl. .................... 252/500; 252/503; 252/518.1; 252/519.5; 106/105; 106/1.16
(58) Field of Search ............................... 106/1.05, 1.16; 252/500, 503, 518.1, 519.5

(56) References Cited

U.S. PATENT DOCUMENTS

| | | | |
|---|---|---|---|
| 3,598,763 A | 8/1971 | Matsuoka et al. | 252/518 |
| 3,663,458 A | 5/1972 | Masuyama et al. | 252/518 |
| 3,863,193 A | 1/1975 | Matsuura eta l. | 338/20 |
| 3,868,334 A | 2/1975 | Van Loan | 252/520 |
| 3,882,059 A | 5/1975 | Elderbaum | 29/25.42 |
| 3,916,366 A | 10/1975 | Jefferson | 252/519 |
| 4,045,374 A | 8/1977 | Nagasawa et al. | 252/517 |
| 4,064,475 A | 12/1977 | Kouchich et al. | 118/7 |

(List continued on next page.)

FOREIGN PATENT DOCUMENTS

| | | |
|---|---|---|
| EP | 0 000 864 | 3/1979 |
| EP | 0 037 577 A1 | 10/1981 |
| EP | 0 074 312 | 3/1983 |
| EP | 0 184 182 | 6/1986 |
| EP | 184 645 A2 | 6/1986 |
| EP | 302 294 A1 | 2/1989 |
| FR | 2 504 756 | 10/1982 |
| GB | 1 478 772 | 7/1977 |
| GB | 1 487 600 | 10/1977 |
| GB | 2 218 260 A | 11/1989 |
| JP | 57-121084 | * 7/1982 |
| JP | 57-121085 | * 7/1982 |

OTHER PUBLICATIONS

"Zinc Oxide Varistors—A Review," Levinson et al., *Ceramic Bulletin*, vol. 65, No. 4 (1986); pp. 639–646.

Primary Examiner—Yogendra N. Gupta
Assistant Examiner—Derrick G. Hamlin
(74) Attorney, Agent, or Firm—Chapman and Cutler

(57) ABSTRACT

A thixotropic ink for use in manufacturing a varistor comprising the following constituents:
  a) zinc oxide,
  b) ceramic structure influencing additives including bismuth oxide, boric acid, boron oxide, chromium oxide, cobalt oxide, magnesium oxide and tin oxide,
  c) a grain growth influencing additive selected from the group consisting of antimony oxide, silicon dioxide and titanium dioxide,
  d) an organic solvent carrier,
  e) an organic viscosity influencing additive, and
  f) an organic binder.

The composition may serve as a ceramic ink for use in the manufacture of multilayer varistors, especially using a screen printing process.

13 Claims, 8 Drawing Sheets

U.S. PATENT DOCUMENTS

| | | | |
|---|---|---|---|
| 4,075,968 A | 2/1978 | Caddock | 118/7 |
| 4,148,135 A | 4/1979 | Sakshaug et al. | 338/21 |
| 4,186,367 A | 1/1980 | Chakrabarty et al. | 338/21 |
| 4,246,866 A | 1/1981 | Hopings et al. | 118/215 |
| 4,290,041 A | 9/1981 | Utsumi et al. | 338/21 |
| 4,296,002 A | 10/1981 | Sokoly et al. | 252/518 |
| 4,349,496 A | 9/1982 | Levinson | 264/61 |
| 4,492,163 A | 1/1985 | Ericsson | 101/126 |
| 4,493,254 A | 1/1985 | Landesman et al. | 101/123 |
| 4,551,268 A | 11/1985 | Eda et al. | 252/519 |
| 4,575,440 A * | 3/1986 | Palilla | 264/61 |
| 4,607,316 A | 8/1986 | Wada et al. | 361/321 |
| 4,612,689 A | 9/1986 | deWild et al. | 29/25.42 |
| 4,638,284 A | 1/1987 | Levinson | 338/21 |
| 4,675,644 A | 6/1987 | Ott et al. | 338/21 |
| 4,730,179 A | 3/1988 | Nakata et al. | 338/20 |
| 4,747,211 A | 5/1988 | Gilleo et al. | 29/852 |
| 4,749,421 A | 6/1988 | Matsui et al. | 156/89 |
| 4,811,164 A | 3/1989 | Ling et al. | 252/518 |
| 4,859,364 A | 8/1989 | Yamamoto et al. | 252/512 |
| 4,863,517 A | 9/1989 | Hang et al. | 252/518 |
| 4,918,421 A | 4/1990 | Lawless et al. | 338/2.1 |
| 4,939,991 A | 7/1990 | Szarka | 101/115 |
| 4,953,459 A | 9/1990 | Ericsson | 101/115 |
| 4,959,262 A | 9/1990 | Charles et al. | 428/329 |
| 4,985,098 A | 1/1991 | Kohno et al. | 156/89 |
| 5,039,452 A * | 8/1991 | Thompson et al. | 252/518 |
| 5,115,221 A | 5/1992 | Cowman | 338/21 |
| 5,134,540 A | 7/1992 | Rutt | 361/321 |
| 5,155,464 A | 10/1992 | Cowman et al. | 338/21 |
| 5,235,310 A | 8/1993 | Cowman et al. | 338/21 |

* cited by examiner

VARISTOR INK FORMULATIONS

This patent application is a division of U.S. application Ser. No. 08/384,805 filed on Feb. 6, 1995 and now U.S. Pat. No. 5,973,588, issued Oct. 26, 1999, which is a continuation of application Ser. No. 08/206,251, filed Mar. 4, 1994 (now abandoned), which in turn is a continuation of application Ser. No. 07/543,528, filed Jun. 26, 1990 (now abandoned).

This patent application is also related to U.S. Pat. No. 5,235,310, entitled Varistors Having Interleaved Electrodes; U.S. Pat. No. 5,115,221, entitled Varistors Structures, U.S. Pat. No. 5,155,464, entitled Varistors of Generally Cylindrical Configuration; and application Ser. No. 07/543,529, filed Jun. 26, 1990, entitled Varistor Manufacturing Method and Apparatus (now abandoned), but which was refiled and issued Nov. 17, 1998 as U.S. Pat. No. 5,837,178.

The teachings of these patents and applications are incorporated herein by reference.

BACKGROUND OF THE INVENTION

1. Field of the Invention

The field of the present invention relates to varistor compositions.

2. Description of Related Art

Zinc oxide varistors are ceramic semiconductor devices based on zinc oxide. They have highly non-linear current/voltage characteristics, similar to back-to-back Zener diodes, but with much greater current and energy handling capabilities. Varistors are produced by a ceramic sintering process which gives rise to a structure consisting of conductive zinc oxide grains surrounded by electrically insulating barriers. These barriers are attributed to trap states at grain boundaries induced by additive elements such as bismuth, cobalt, praseodymium, manganese and so forth.

The electrical characteristics of a metal oxide varistor, fabricated from zinc oxide, are related to the bulk of the device. Each zinc oxide grain of the ceramic acts as if it has a semiconductor junction at the grain boundary. The non-linear electrical behavior occurs at the boundary of each semi conducting zinc oxide grain. Accordingly, the varistor can be considered as a multi-junction device, composed of many series and parallel connections of grain boundaries. The device behavior may be analyzed with respect to the details of the ceramic microstructure. Mean grain size and grain size distribution play a major role in electrical behavior.

Fabrication of zinc oxide varistors has traditionally followed standard ceramic techniques. The zinc oxide and other constituents are mixed, for example by milling in a ball mill, and are then spray dried. The mixed powder is then pressed to the desired shape, typically tablets or pellets. The resulting tablets or pellets are sintered at high temperature, typically 1,000° to 1,400° C. The sintered devices are then provided with electrodes, typically using a fired silver contact. The behavior of the device is not affected by the configuration of the electrodes or their basic composition. Leads are then attached by solder and the finished device may be encapsulated in a polymeric material to meet specified mounting and performance requirements.

In the device thus fabricated, the bulk of the varistor between its contact or electrode layers thus consists primarily of zinc oxide grains of a predetermined average grain size, yielding a specific resistivity per unit of thickness dimension. In designing a varistor for a given nominal varistor voltage, it is therefore basically a matter of selecting a device thickness such that the appropriate number of grains is in series between the electrodes. The voltage gradient of the varistor material, in terms of volts per unit of thickness dimension, can be controlled by varying the composition and manufacturing conditions of the varistor. Altering the composition of the metal oxide additives enables the grain size to be changed for this purpose. In practice, the voltage drop per grain boundary junction is approximately constant and does not vary greatly for grains of different sizes. Accordingly, varistor voltage is primarily determined by the thickness of the material and the size of the grains.

The construction and performance of varistors is discussed inter alia in "Zinc Oxide Varistors—A Review" by L. M. Levinson and H. R. Philipp, *Ceramic Bulletin*, Volume 65, No. 4 (1966), which article may be referred to for further detail.

A multiplicity of specific varistor compositions are known and described, inter alia, in the following patent specifications: U.S. Pat. No. 3,598,763; U.S. Pat. No. 3,663,458; U.S. Pat. No. 3,863,193; U.S. Pat. No. 4,045,374 and GB 1,478, 772. Methods of manufacturing varistors are described, inter alia, in U.S. Pat. Nos. 3,863,193 and 4,148,135.

SUMMARY OF THE INVENTION

It is an object of the present invention to provide improved compositions of material for use in producing varistors. It is a further object of the invention to provide suspensions of zinc oxide based materials in solvents for use in producing varistors using a wet screen printing method.

The present invention is especially directed to compositions facilitating the manufacture of multilayer varistors. While it has generally been accepted that a multilayer varistor would have a number of advantages as compared with the equivalent radial product, manufacturing problems have hitherto prevented any widespread move towards multilayer varistors.

The advantages of multilayer construction as applied to varistors include compact size for equivalent electrical characteristics, as compared with a conventional radial device. Multilayer varistors may also be completely symmetrical, fully passivated and have good IV characteristics. As against this, possible disadvantages include relatively high capacitance and potential reactions between the ceramic and the internal electrodes, especially the interaction of palladium and bismuth complexes.

The present invention is further especially directed to compositions for use in the manufacture of multilayer varistors using printing techniques. A method of manufacturing a multilayer varistor by a sequence of printing operations forms a subject of a co-pending patent application by the present applicants. In a particular manufacturing method disclosed in said co-pending application, both the ceramic layers and the electrode patterns are successively screen printed. A particular advantage of screen printing as compared with other manufacturing technologies for multilayer systems is that the preparation of a thin sheet material as a preliminary step in the process may be obviated, by virtue of the direct laying down of the ceramic material and the electrode pattern in a succession of printing steps. The printing process therefore provides a more convenient end expeditious method of manufacturing multilayer products, and in particular varistors, than methods involving the preliminary step of fabricating sheets or panels of ceramic and electrode material for interleaving in a later production operation. However, the successful implementation of a printing manufacturing technology for multilayer varistors requires the provision of compositions suited to this production process and capable of cooperating with solvent materials to provide the required ceramic and electrode inks.

It is therefore also a particular object of the present invention to provide inks suited to screen printing manufacturing technologies for multilayer varistors. Powder compositions suitable for incorporation in such inks form the subject of a co-pending application of the present applicants, as indicated above, and incorporated herein by reference.

According to the invention, there is provided a composition material for use in manufacturing a varistor comprising:

(a) zinc oxide;

(b) a plurality of ceramic structure influencing additives selected from the group consisting of at least bismuth oxide, boric acid, chromium oxide, cobalt oxide, manganese oxide and tin oxide;

(c) at least one grain growth influencing additive selected from the group consisting of at least antimony oxide, silicon dioxide and titanium dioxide;

(d) an organic solvent carrier;

(e) an organic viscosity-influencing additive; and (f) an organic binder.

The above-mentioned plurality of ceramic structure influencing additives may include at least bismuth oxide, cobalt oxide and manganese oxide. Preferably the composition material comprises at least one electrical performance influencing additive selected from the group consisting of at least aluminum nitrate and silver oxide. The composition material may also comprise nickel oxide as a further additive and magnesium hydroxide as an additional additive.

In another aspect, the invention provides a composition material for use in manufacturing a varistor comprising:

(a) 94 to 98 mole percent of zinc oxide;

(b) 1 to 4 mole percent of a plurality of ceramic structure influencing additives selected from the group consisting of at least bismuth oxide, boron oxide, chromium oxide, cobalt oxide, manganese oxide and tin oxide;

(c) 0.1 to 1.6 mole percent of at least one grain growth influencing additive selected from the group consisting of at least antimony oxide, silicon dioxide and titanium dioxide;

(d) an organic solvent carrier;

(e) an organic viscosity-influencing additive; and (f) an organic binder.

The composition material may comprise 0.002 to 0.01 mole percent of at least one electrical performance influencing additive selected from the group consisting of at least aluminum nitrate and silver oxide. The composition material may also comprise 0.6 to 1.1 mole percent of nickel oxide as a further additive, and at least 0.4 mole percent of magnesium oxide as an additional additive.

Preferably, the inorganic constituents of the composition material are in granular or powder form and the average grain size of the granular or powder form material is less than approximately 2 microns.

Suitably, the relative proportions of the organic constituents are selected so that the mixture of the organic and inorganic constituents of the composition material is in the form of a suspension.

The invention also provides a printing ink comprising a composition material as defined hereinabove, as well as a method of producing a composition material for use in manufacturing a varistor comprising the steps of:

(i) calcining a granular or powder form composition material comprising:

(a) zinc oxide;

(b) a plurality of ceramic structure influencing additives selected from the group consisting of at least bismuth oxide, boron oxide, chromium oxide, cobalt oxide, manganese oxide and tin oxide; and (c) at least one grain growth influencing additive selected from the group consisting of at least antimony oxide, silicon dioxide and titanium dioxide; and (ii) mixing the calcined composition material with an organic solvent carrier, an organic viscosity-influencing additive, and an organic binder.

Preferably the above-indicated additive is added for a first stage of the mixing step, and the binder is added following the first stage of the mixing step, the binder being mixed with other constituents of the material in a second stage of the mixing step. The first stage of the mixing step suitably comprises a milling operation.

DESCRIPTION OF THE DRAWINGS

The present invention will be described in detail below relative to the associated drawings, in which like items are identified by the same reference designation, wherein.

DETAILED DESCRIPTION OF THE INVENTION

Figure 1:
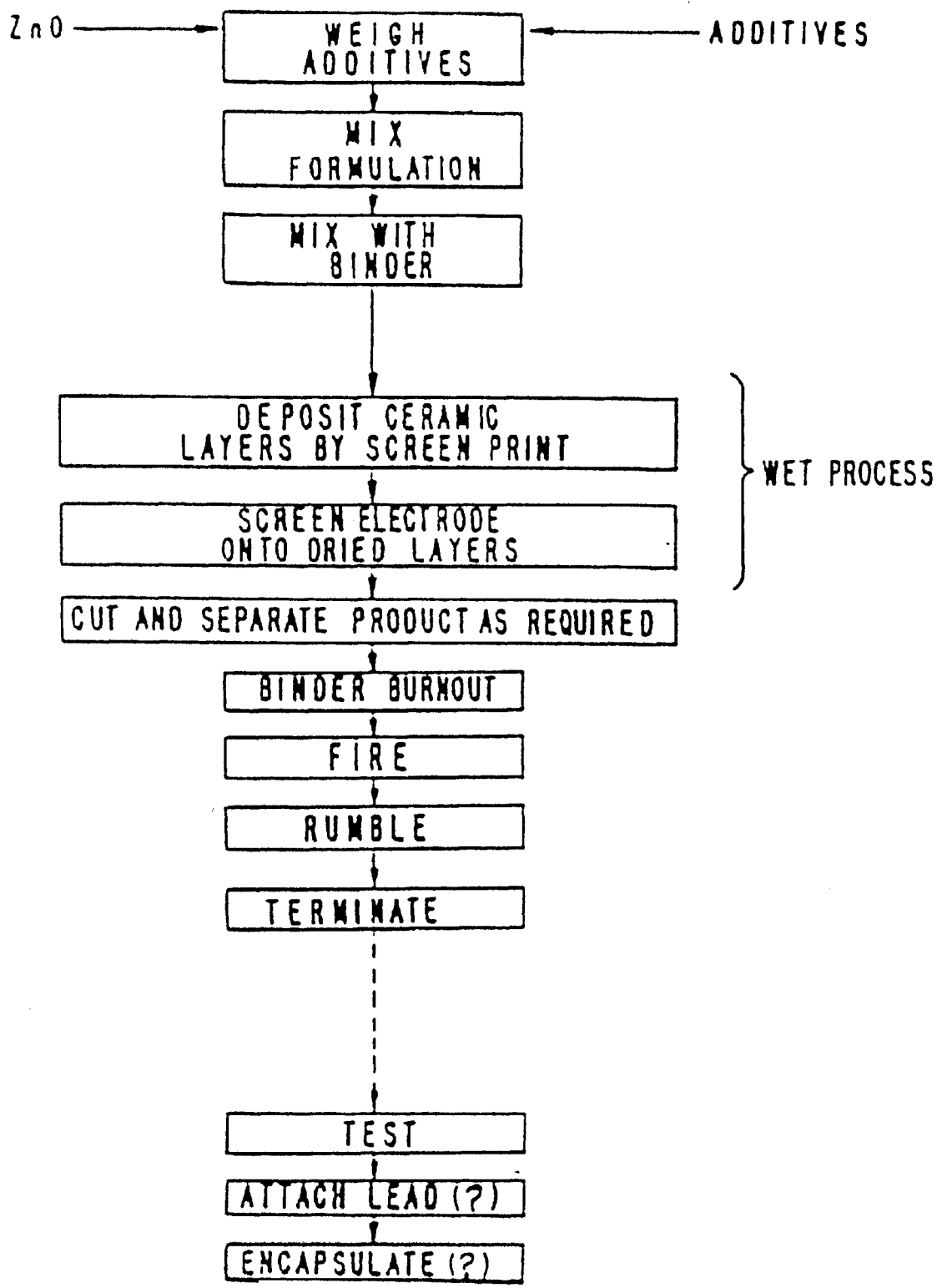
FIG. 1 is a block diagram showing a sequence of process steps for the manufacture of a multilayer varistor.

As shown in FIG. 1, zinc oxide power and additives are weighed preparatory to mixing to provide a powder formulation suitable for manufacture of the particular varistor desired. The powder formulation is then mixed with suitable organic constituents to provide the ceramic ink. A cycle of operations then takes place, in which, following the preparation of suitable screens, ceramic layers are deposited onto a substrate by screen printing and are interleaved with electrode layers similarly screen printed onto semi-dried layers of ceramic material.

Following completion of the printing operations, the printed layered product supported on the substrate is separated to provide a multiplicity of multilayer varistor units. Subsequent treatment steps are broadly conventional, in that the binder and other organics are burnt out, the product is then fired and rumbled, terminations are applied for electrical communication between the varistor and other circuit elements, and the finished varistor is then tested. Optional final steps include the attachment of leads and overall encapsulation.

Figure 3:
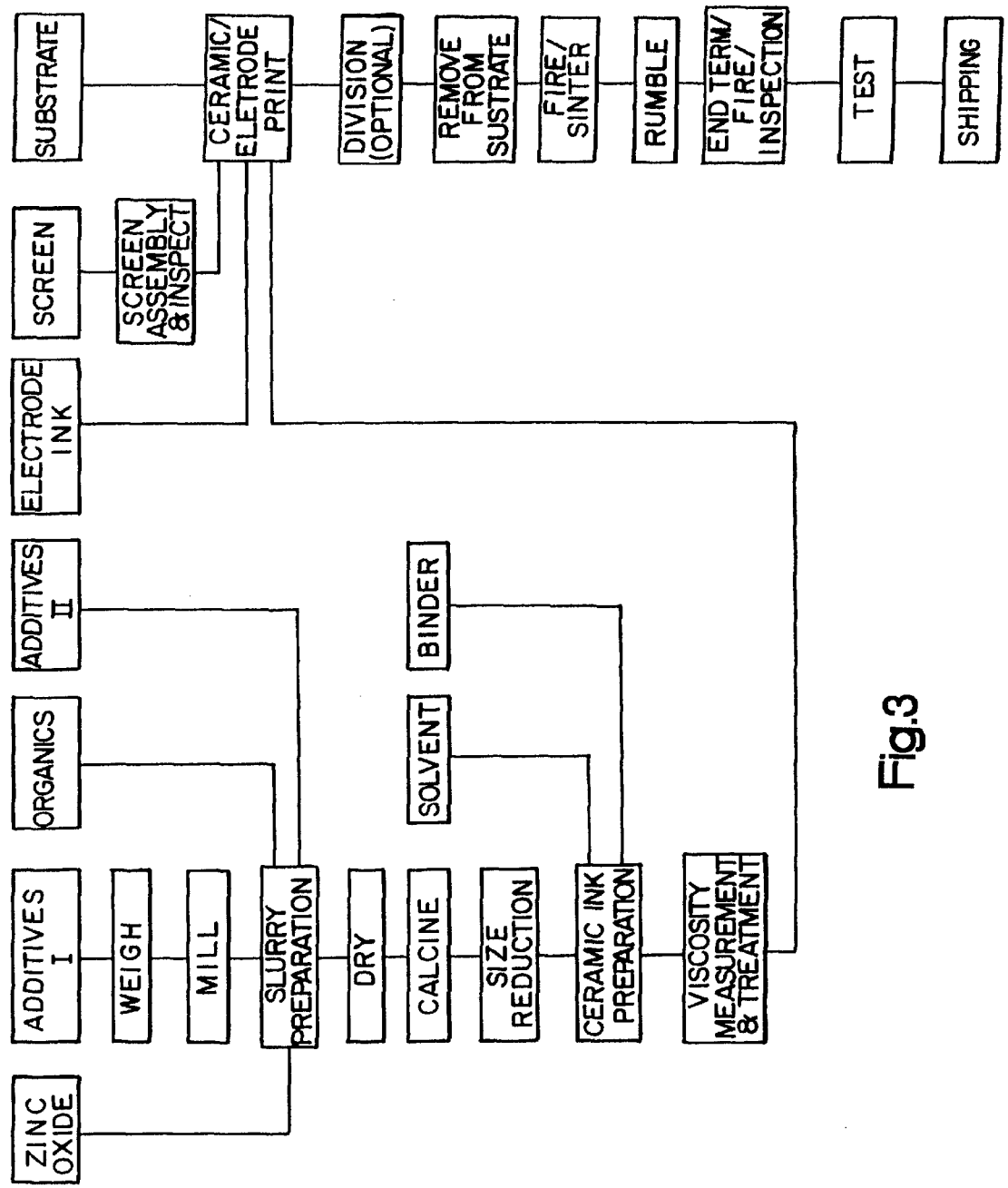
FIG. 3 is a flow diagram of one embodiment of the invention, showing the steps involved in preparing the various component constituents and parts involved in and required for the manufacture of multilayer varistors using a screen printing technique.
Figure 4:
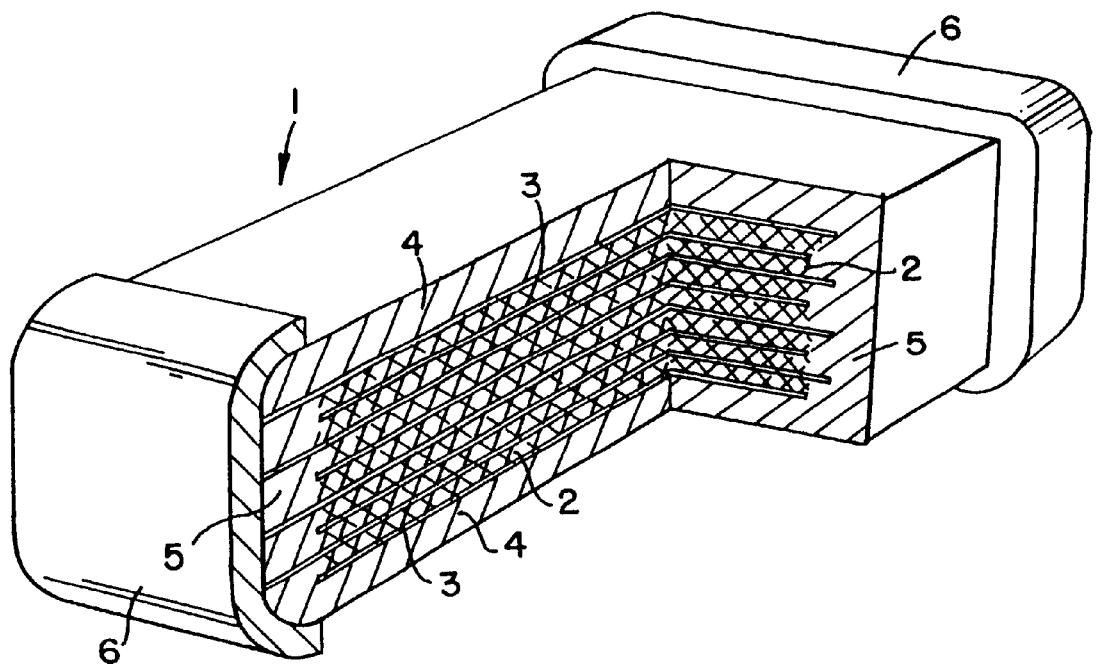
FIG. 4 is a part cut-away pictorial view of a multilayered varistor according to the present invention.
Figure 5:
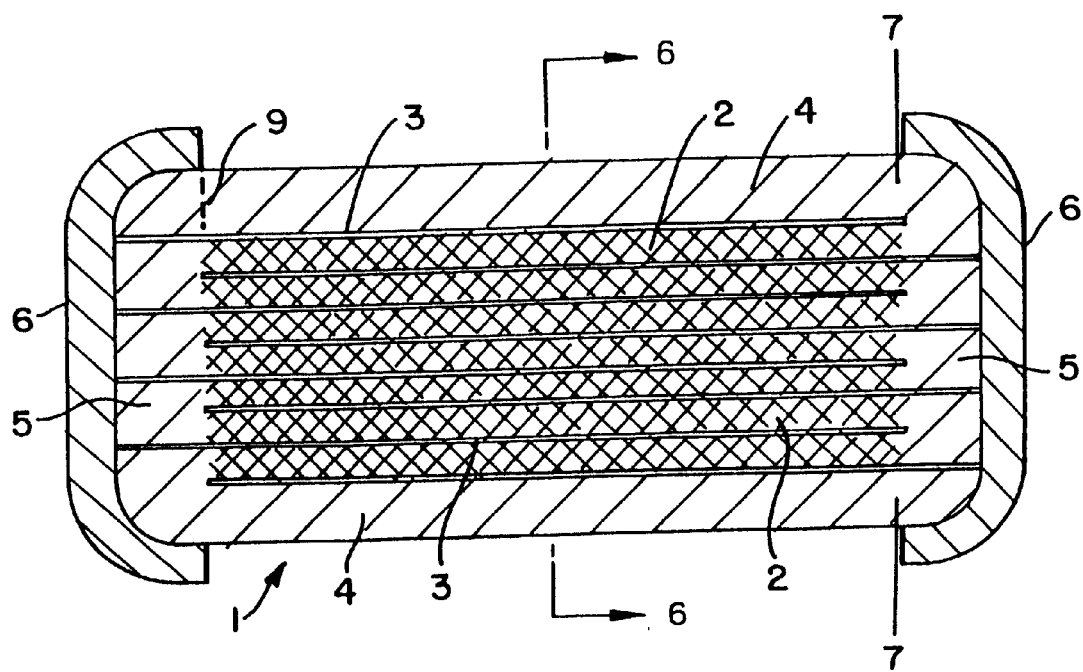
FIG. 5 is a sectional view of the varistor of FIG. 4 on a longitudinal section plane.
Figure 6:
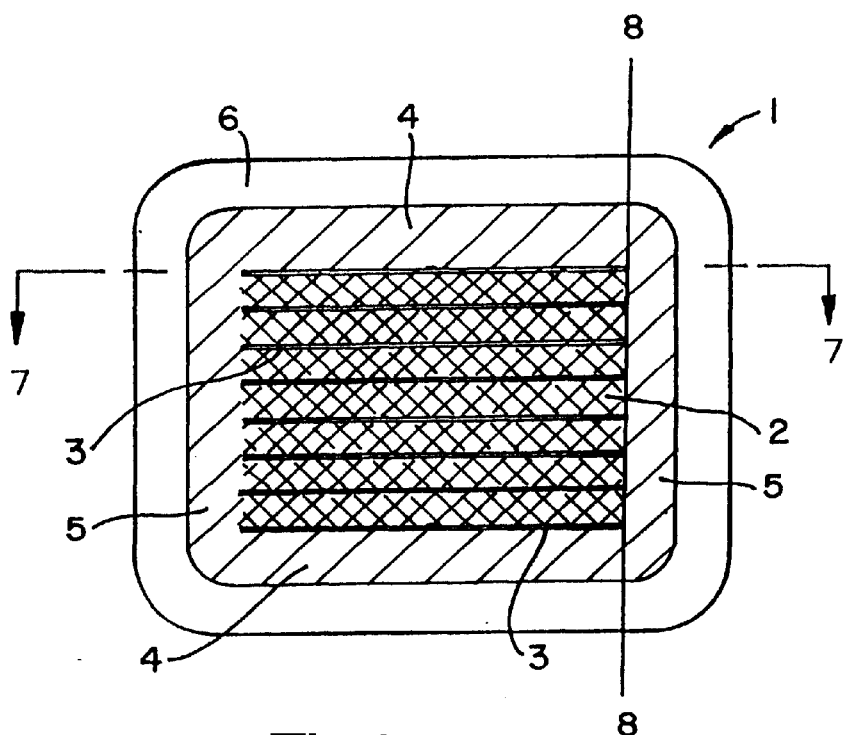
FIG. 6 is a transverse sectional view of the varistor of FIGS. 4 and 5 on the section plane VI—VI of FIG. 5.
Figure 7:
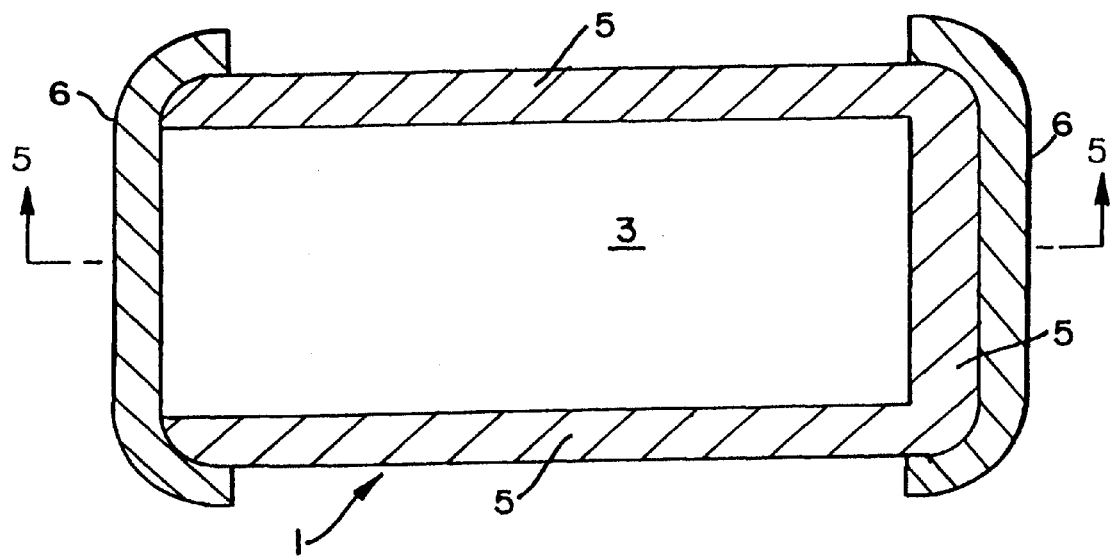
FIG. 7 is a sectional view from above the varistor of FIGS. 4, 5 and 6 on the section plane VII—VII of FIG. 6.

This procedure is also illustrated in FIG. 3, which is a flow diagram showing the provenance and handling steps involved in preparation of each of the constituents and component parts used in the manufacturing method, the left-hand side of the diagram deals broadly with the preparation of the physical constituents, as set forth in greater detail below, while the right-hand part sets forth the sequence of mechanical steps involved in handling the components used in the method.

Turning to the left-hand side of the drawing, the initial stages of preparation involve the procurement of appropriate quantities of zinc oxide powder, additives and organics. The zinc oxide powder, additives and organics are brought together in a slurry preparation step, following which the resultant product is spray-dried, calcined for size reduction, and dried. Preparation of ceramic ink then takes place, the calcined powder being combined with further organics. The resultant ink undergoes a viscosity measurement check prior to its use in the varistor production method of the invention.

Adverting now to the right-hand side of the drawing, electrode ink is procured, suitable screens for ceramic and electrode printing are prepared, assembled and inspected, and finally, substrates are also prepared. The substrates are loaded into the printing machine, where the central steps of the present process takes place. Downstream steps include separation of the finished varistor(s) from the substrate, cutting of the slab-form product to provide individual varistor units, as required, firing and sintering, rumbling to remove sharp edges and corners from the separated individual product units, as noted above, inspection, test and final output stages preparatory to shipment.

Co-pending patent applications, which have now issued into the above-identified patents or have been abandoned, as also identified above, disclose details of multilayer varistor constructions derived from the screen printing manufacturing process of the invention. Although these details are fully shown in the above-identified patents and application, the following description is provided for a fuller understanding of the invention herein.

As shown in FIGS. 4 to 7, a varistor 1 is formed from a multiplicity of inter electrode ceramic layers 2, each of which is sandwiched between upper and lower electrode layers 3. This sandwiched construction is encased in upper and lower outer ceramic layers 4 by peripheral ceramic zones 5 on the sides and certain end portions of the electrodes. At each axial end of the generally rectangular varistor 1 shown in these drawings, alternate electrode layers 3 are carried to the axial end faces of the ceramic material, where they are in conductive association with end terminal caps 6, typically formed from silver/palladium coatings. A typical dimension for a varistor 1 of this kind is 3000.0×2500.0 microns, one micron being equal to one thousandth of a millimeter. The electrode layers may be approximately 0.3 to 4.0 microns thick, while the inter electrode ceramic layers 2 may vary between 10.0 and 600.0 microns, depending on the performance requirements of the unit. The outer ceramic layers 4 are typically up to three times the thickness of the inter electrode ceramic layers 2 and may therefore be between 30.0 and 1800.0 microns thick, as are the side ceramic zones 5 and the ceramic material sections axially outward of the electrode layer ends not connected to an end terminal cap 6.

A layered varistor structure 1 of this kind is suitably produced by a screen printing process, in which close control is maintained over the thicknesses of the successive layers. In addition, parallelism between electrode layers in a multilayer varistor 1 is of first importance. Electrode layers 3 should be parallel within relatively close limits, as all of the electrode layers 3 must fire at the same time, when the device is activated.

In summary therefore, in order to ensure proper performance of a varistor 1 of the kind to which the present invention is directed, it is important that each inter electrode ceramic layer 2 be of precisely the same thickness, within close limits, typically + and −2%, as every other ceramic inter electrode layer 2. Thus each layer 2 must define a plane or family of planes, which is parallel to every other plane or plane family defined by every other layer. In sectional views such as those of FIGS. 5 and 3, parallelism of the layers, both of ceramic and electrode material, throughout the vertical height of the layered stack structure device 1 is therefore of great importance.

By contrast, alignment of the ends and edges of the electrode layers with one another is not so crucial. A vertical plane aligned generally with the end regions of the electrode layers is indicated by the line 7—7 in FIG. 5, but it will be seen that the ends of the electrode layers are not necessarily exactly aligned one with another. Similarly, in the transverse section of FIG. 6, the side edges of the electrode layers are not necessarily in full alignment with the line 8—8. The performance of the varistor 1 is not determined so much by the areas of the inter electrode layers 3 as by their thickness and homogeneity. In terms of proneness to undesired tracking, it is in fact the zone indicated by the dotted line, reference 9 in FIG. 5, which is likely to be most critical in determining performance of the varistor 1, since current flow takes place through the path of least resistance within the device. Unless the path along the dimension 9 is of greater resistance than that provided within the structure between the end term caps 6 via the electrode layers 3, then tracking can take place at this part of the unit.

Figure 8:
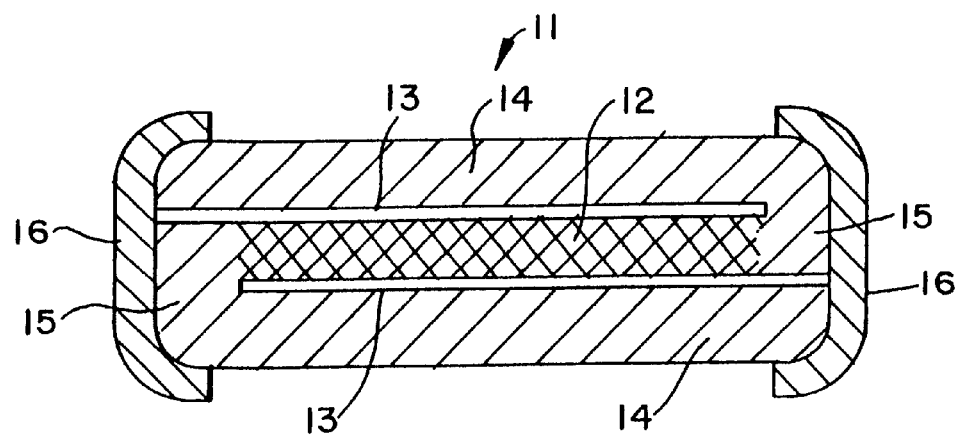
FIG. 8 is a longitudinal sectional view of a further novel configuration of a layered varistor according to the present invention.

FIG. 8 illustrates an alternative construction 11 of a varistor 11 according to another embodiment of the present invention, in which only a single layer of inter electrode ceramic material 12 is provided between two electrode layers 13. These electrode layers 13 are spaced from the exterior of the varistor by outer ceramic layers 14. One end of each of the electrode layers 13 extends outward to an end term cap 16. The other ends of the electrode layers extend to an associated peripheral zone 15. The operation of this device 11 and its manufacture take place in similar manner as already described for the embodiment of FIGS. 3 to 7.

Figure 9:
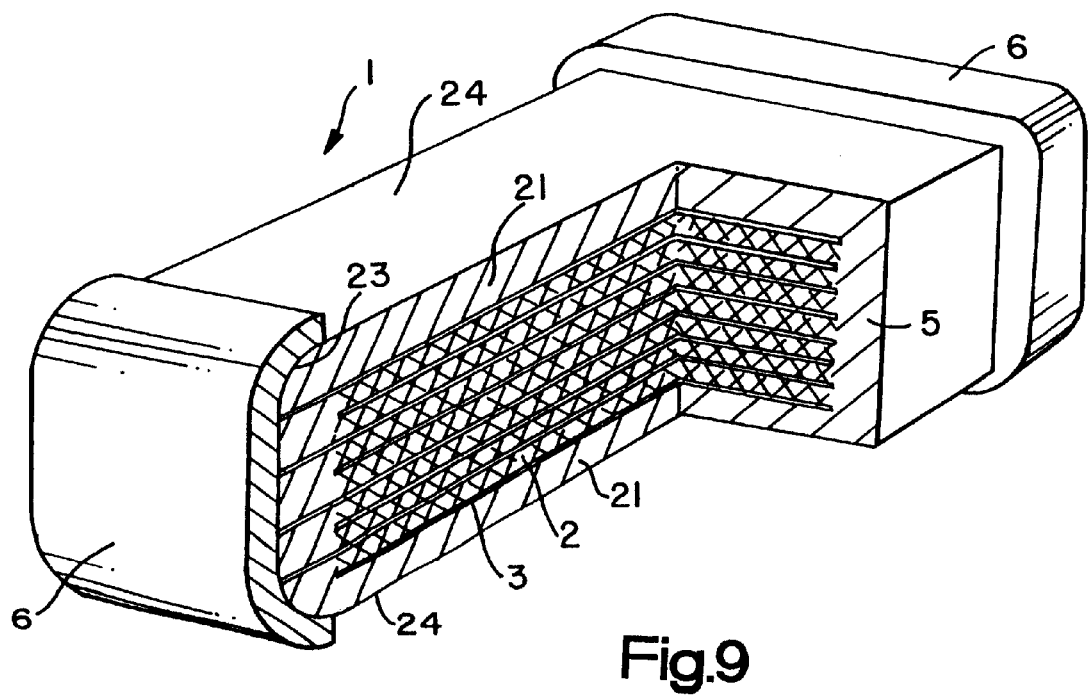
FIG. 9 is a sectional view similar to that of FIG. 5 of a further embodiment and construction of a layered varistor according to the invention.

The varistors 1, 11 of FIGS. 3 to 7, and FIG. 8, respectively, are required to have in the outer ceramic layers 4 and 14, respectively, essentially an insulating layer. This insulating layer may be defined in the manner shown in FIG. 9 for a varistor broadly similar to that of FIGS. 3 to 7, by having the outer layer 21 of ceramic material of greater thickness than the inter electrode ceramic layers 2. In this way the possibility of undesired tracking taking place between the end term cap 6, where it is carried around the profiled corners 23 of the generally rectangular varistor block 1, and the outermost electrode layers 3, closest to the upper and lower surfaces 24, is reduced. Typically the thickness of this outer layer 21 should be, as shown in general terms in FIG. 9, approximately three times the thickness of the inter electrode ceramic layers 2.

Figure 10:
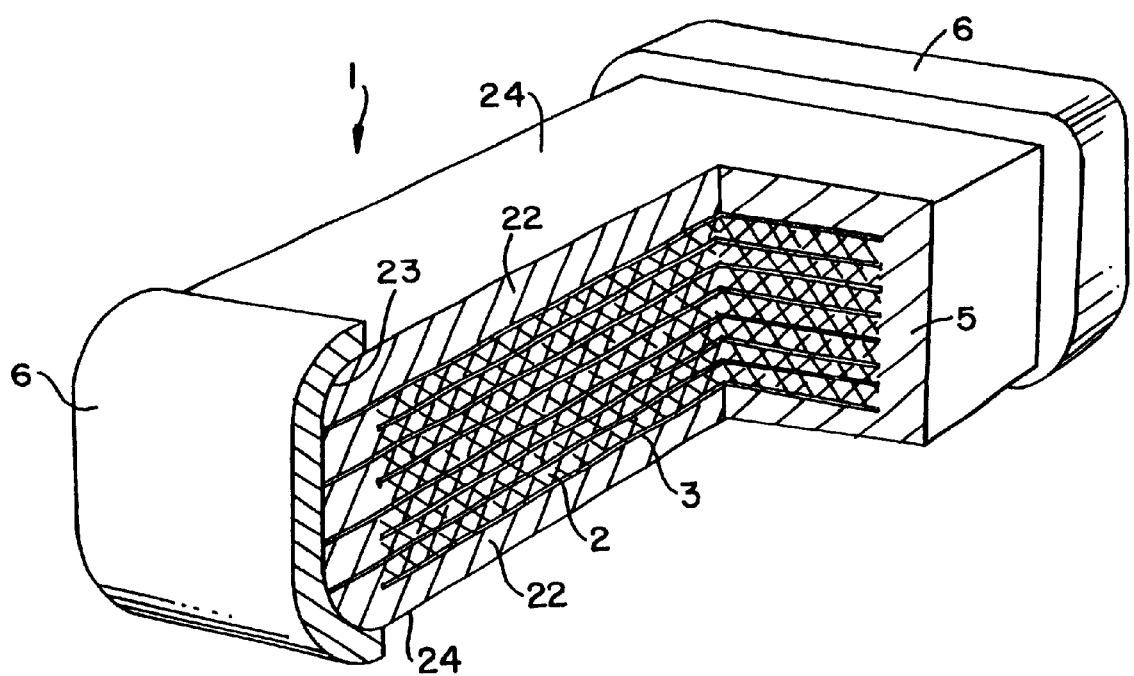
FIG. 10 is a longitudinal sectional view, again similar to that of FIG. 5, of another construction of a varistor according to another embodiment of the invention.

Alternatively, the outer layer 21 of ceramic material may be formed from a ceramic of a different composition, as designated by reference 22 in FIG. 10, which again represents a varistor 1 broadly similar to that of FIGS. 3 to 7. In this instance, the ceramic material of the outer layer may be of the same basic formulation as that of the rest of the varistor 1, but have a finer structure, thereby providing a greatly increased number of grain boundaries, which increases the resistance of the outer layer greatly as compared with that of the inter electrode ceramic layers 2. Again in this manner, the proneness of the outer layer 22 to undesired tracking may be reduced. Alternatively, a ceramic material of a different composition may be used for the outer layer 22, but it may nonetheless be desirable to have a greater thickness of this differently formulated ceramic material in the outer regions 22 of the varistor 1, for improved safety and security. Around the edges of the electrode layers 3 where they do not extend to the end term cap 6, the ceramic material is also provided in sufficient thickness and/or of an appropriate composition to ensure that outward tracking cannot take place. The use of a different ceramic material for the outer layers 22 may also be used together with enhanced thickness in these layers 22, the outer layers 22 being for example up to three times the thickness of the ceramic inter electrode layers 2. Thus in summary, the electrode material 3 may be the same throughout the product with outer layers 22 of enhanced thickness, or the outer layers 22 may be of different material without thickness enhancement or with only a modest degree of increased thickness, or finally, the outer layers 22 may be of different material and also of significantly greater thickness than the inter electrode layers 2.

Figure 11:
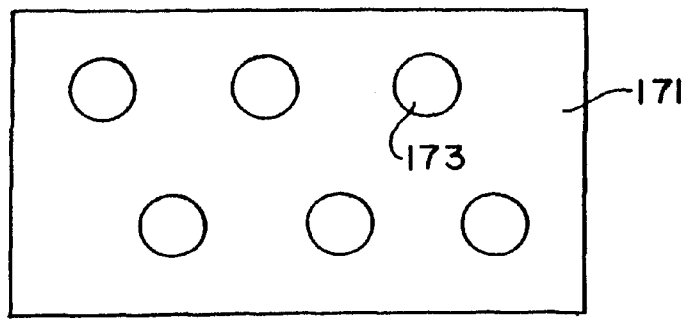
FIGS. 11 and 12 show a print pattern for planar varistor arrays.
Figure 12:
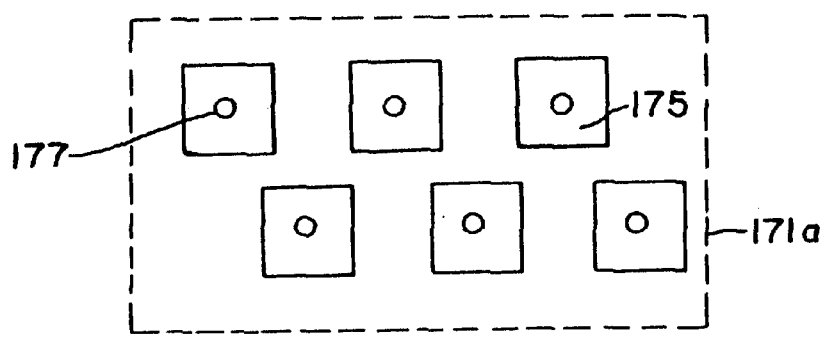
Figure 13:
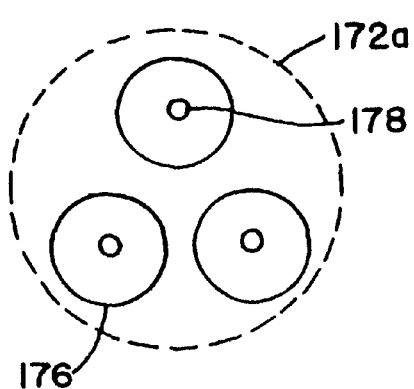
FIGS. 13 and 14 show a printed pattern for circular arrays.
Figure 14:
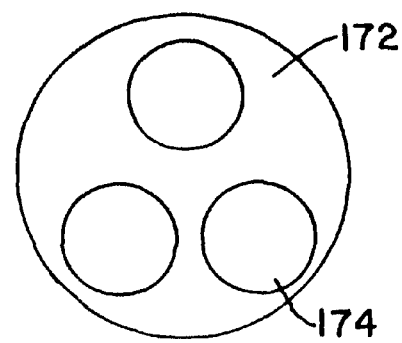

FIGS. 11, 12, 13, and 14 show print patterns for multilayer arrays, planar arrays in FIGS. 11 and 12, and circular arrays in FIGS. 13 and 14. In an array-type varistor structure of multi-layers, a large ground plate 71 (FIG. 11), 172 (FIG. 14) is provided with holes or apertures areas 173, 174, respectively, and in FIGS. 12 and 13, a multiplicity of individual electrodes 175, 176, respectively, are defined for each aperture or hole 173, 174, respectively, by means of a second printing operation within a boundary 171*a*, 172*a*, respectively, corresponding to the periphery of the ground plate 171, 172 with there being at least two planes or layers of individual electrodes. This second printing operation provides the pin-out contact areas defined by small diameter apertures 177, 178 surrounding each of the apertures or holes within the finished product. Arrays can also have very large numbers of pins and can be of overall circular configuration (FIG. 12), or so-called D-type or rectangular units (FIG. 11). In D-type arrays, each row of pins 177 is typically offset by half the pitch of the pins 177 relative to the adjacent row or rows on the same plane. In addition, the printed electrode ink areas defining the pin-out contact regions may have any of a diversity of configurations, including circular, square, elliptical and irregular also on the same plane.

Following subdivision of the finished laminate by sawing, where required, or without cutting or with only limited cutting, where arrays or larger units are in question, the individual products are removed from the substrate by any suitable means.

The invention of this patent provides novel compositions of inks suitable for use in the above-described method and in production of multilayer varistors as also described above.

Table 1, following, lists materials present in powder formulations for varistors, and in particular in ceramic powder compositions for use in the manufacture of multilayer varistors:

TABLE 1

| MATERIAL | FORMULA |
|---|---|
| Zinc Oxide | ZnO |
| Bismuth Oxide | $Bi_2O_3$ |
| Cobalt Oxide | $Co_2O_3$ |
| Manganese Oxide | $MnO_2$ |
| Nickel Oxide | NiO |
| Antimony Oxide | $Sb_2O_3$ |
| Silicon Dioxide | $SiO_2$ |
| Magnesium Hydroxide | $Mg(OH)_2 \rightarrow MgO$ |
| Aluminum Nitrate | $Al_2O_3$ added as $Al_2(NO_3)_3 \cdot 9H_2O$ |
| Chromium Oxide | $Cr_2O_3$ |
| Barium Carbonate | $BaCO_3 \rightarrow BaO$ |
| Boric Acid | $HBO_3$ |
| Titanium Dioxide | $TiO_2$ |
| Tin Oxide | $SnO_2$ |
| Silver Oxide | $Ag_2O$ |

These various materials as listed in Table 1 may be grouped as follows:

1. ZINC OXIDE

Zinc oxide typically comprises from 85 to 95 mole-percent of the bulk of a varistor formation, for example 92 mole-percent of the bulk. For low voltage varistors, barium grains may be added, in the form of barium carbonate, transformed to barium oxide during the manufacturing process. The function of the barium is to promote the growth of zinc oxide grains and this additive disappears after sintering of the varistor.

2. GLASS-RELATED MATERIALS (CERAMIC STRUCTURE INFLUENCING ADDITIVES)

These additives serve to enhance the development of the ceramic structure. They include the following materials listed in Table 1:

Bismuth oxide, added in the trioxide form. This is a glass-forming additive.

Cobalt oxide is another glass additive agent, assisting the glass frit and serving to maintain phase stability in the ceramic.

Manganese oxide has an augmenting effect similar to that of bismuth oxide.

Chromium oxide is a further glass additive functioning to stabilize the ceramic product.

Boric acid is another glass former.

Boron oxide can also be used.

Tin oxide is yet another stabilizer for the glass structure, albeit less commonly used than those already cited.

3. GRAIN GROWTH MODIFIERS (GRAIN GROWTH INFLUENCING ADDITIVES)

Antimony oxide is an additive controlling grain growth. It acts as an inhibitor to keep grain size small. This is particularly important in high voltage devices.

Silicon dioxide is a strong grain growth inhibitor and is added to compositions or power formulations to get high values of voltage per millimeter thickness. Silicon dioxide per se is however highly conducting and absorbs energy when the junctions at the depletion layer break down and conduct. In a varistor, the grain structure is almost entirely zinc oxide and the additives go into the glass matrix which surrounds the grains. It is this aspect of the construction of varistors that results in the highly significant impact of small quantities of additives on the performance of the device, as exemplified by the action of the conductive silicon dioxide at the grain boundaries. The remaining grain growth enhancing additive of those listed in Table 1 is titanium dioxide, also usable in multilayer varistors.

4. NICKEL OXIDE

Nickel oxide is a unique additive, having properties not achieved by any of the other additive materials and directed to stabilization of the microstructure. The nickel oxide assists the formation of a microstructure in the ceramic material suitable for handling both DC and AC stress.

5. JUNCTION-RELATED ADDITIVES (ELECTRICAL PERFORMANCE INFLUENCING ADDITIVES)

Aluminum nitrate is a crucial additive under this category. The nitrate is transformed into an oxide in the course of the manufacturing method. As in the case of the majority of other additives, it goes into the glass matrix surrounding the grains. Aluminum oxide in very small parts per million enhances the conductivity of the zinc oxide. For higher additive levels however, the aluminum oxide diffuses into the grain boundaries and can create a leaky device by reducing inter granular activity. Conversion of the nitrate takes place during sintering. Silver oxide is used in combination with the aluminum additive in various formulations, to achieve certain desirable results in the varistor.

6. OTHER ADDITIVES

Magnesium hydroxide, which transforms to magnesium oxide in the finished product, comes under this category. The function and action of this additive is obscure, and the nature of its contribution to the performance of the varistor device is not completely understood. It is however a traditional additive material in radial-type varistors.

The foregoing categorization of the materials comprised in a powder formulation for a varistor product represents only one manner of viewing the purpose and function of each of the various materials and additives comprised in the product. The particular analysis set forth is however effective in explaining certain of the performance characteristics of varistor devices, and in particular multilayer constructions of such devices, and has been found beneficial in the development and preparation of useful novel powder formulations, especially formulations particularly suited to use in ceramics inks for application in screen printing varistor production methods. It is not however claimed to be a definitive categorization or subdivision of these additives and materials, given that many aspects of varistor operation and performance remain obscure or not fully understood. The value of the present classification resides in its ability to facilitate understanding of certain aspects of varistor performance and in assisting in the development of suitable formulations for, in particular, varistor products manufactured by screen printing methods.

Table 2 (following) lists a number of powder formulations found especially suited to the preparation of ceramic inks for use in the manufacture of multilayer varistors by screen printing techniques. For each of the formulations listed, the quantity of both the basic zinc oxide and of each category of additive, as identified above, is quoted in mole-percent. Desirable physical features of the powder formulations listed will be subsequently identified, in discussing the preparation of ceramic inks. It will however be noted from Table 2 that the additives are present in different quantities from formulation to formulation. The precise quantities of additives selected in each category depend on the purpose and performance desired of the varistor. For example, silicon dioxide is a stronger inhibitor of grain growth than antimony oxide. However, the use of silicon in larger quantities may tend to cause a reduction in the resistance of the grain boundaries of the zinc oxide structure. In order to avoid possible problems, for example in regard to product life, which the use of silicon in large quantities might entail, alternative compositions involving a different balance of additives may therefore be substituted or favored depending on the characteristic and/or performance required of the finished device. The balance of functions and the interrelationship between the various additives is also complex and not fully understood. In order to achieve a desired performance from a finished varistor product, reformulation of, example, the glass aspects of the composition may be required and not necessarily a variation of, for example, only a grain growth modifier, such as the silicon dioxide. The various materials and additives react and cooperate together in such a complex way that the adverse consequences of an increased level of silicon may, for example, be offset by modification of the ceramic glass structure. To an extent, therefore, the development of effective and advantageous formulations is an empirical art, guided however by theoretical considerations derived from the known characteristics of each material and additive of the composition

TABLE 2

| MATERIAL | FORMULATION ID | | | | |
|---|---|---|---|---|---|
| | 1 mole Percent | 2 Mole Percent | 3 mole percent | 4 mole percent | 5 mole percent |
| BASIC CONSTITUENT Zinc oxide | 96.9 | 94.9 | 96.3 | 97.3 | 97.2 |
| GLASS-RELATED ADDITIVE selected from | 2.1 | 2.5 | 3.2 | 1.7 | 1.6 |
| Bismuth oxide Boric Acid Chromium oxide Cobalt oxide Manganese oxide Tin oxide | | | | | |
| GRAIN-GROWTH MODIFIERS selected from | 1.0 | 1.5 | 0.5 | 0.5 | 0.2 |
| Antimony oxide Silicon oxide Titanium dioxide | | | | | |
| JUNCTION-RELATED ADDITIVES selected from | 0.005 | 0.005 | 0.003 | 0.004 | 0.009 |
| Aluminum nitrate Silver oxide | | | | | |
| Nickel oxide | — | 0.7 | — | 0.5 | 1.0 |
| Magnesium hydroxide | — | 0.5 | — | — | — |

In all of the formulations shown in Table 2, the mole-percentages relate to dry product.

For use as an ink, it is required that the ceramic powder formulation be maintained in suspension in suitable solvents, and that the ink product thus formed be thixotropic, i.e., exhibit a variable viscosity depending on shear rate. A thixotropic product typically behaves like a very thick or sticky medium when the rate of application of shear force is low, but is capable of flow in the manner of a low viscosity liquid under high rates of shear. A combination of organic materials as solvents and carriers is used to achieve this, in combination with a preferred range of particle size for the dry powder product.

Typically, the preferred grain size is approximately 1.5 microns. Varistor powder as received from the preparatory powder manufacturing stage has usually grains of considerably smaller size, for example from 0.1 to 0.2 microns. The range of grain sizes is also generally relatively wide, and the powder is not fully homogeneous. In order to render this dry powder as received suitable for incorporation in a varistor ceramic ink, the particle size must be increased and the powder homogenized. This is achieved by calcining, a step which is not normally required for most conventional powders as used for radial varistors, but is however nonetheless occasionally used. The calcining step consists of firing the powder as received at between 800° C. and 920° C. and then reducing the fired powder in a milling operation.

In order to then form the thixotropic ceramic ink, organic solvents are then added to the calcined powder. These may include butyl dioxitol acetate or a terpene alcohol. The organic material acts as a carrier for the particles in suspension. Viscosity influencing materials may be added to control the rheology of the ceramic ink, in conjunction with the main solvent additive(s).

The ceramic ink, which is typically green in color, is prepared from the foregoing ingredients as described below. The calcined powder is mixed together with the solvent and the viscosity modifier by ball milling or other mill methods. Suitable portions or quantities of these constituents are quoted in the following Table 3. A further organic product is added after milling to achieve the desired ink properties and fulfill a binder function. The binder may be ethyl cellulose, ethyl hydroxy cellulose or a rosin derivative. The binder has a significant impact on the viscosity of the organic and ceramic powder mixture. For this reason, it is added to the mixture following the milling step. If the full quantity of the binder required to achieve the thixotropic qualities of the finished ink was added before milling, the viscosity of the mixture would be increased to an excessive degree and this would impair milling performance.

In summary therefore, considering the powder and ink preparation process as a whole, a typically 0.25 or less micron grain size powder represents the starting point. This is calcined and then ground to provide particles of 2.0 microns average size. Solvents in the proportions to be specified are then added to this larger particle size product. Ball milling of the organic material and ceramic powder product next takes place, during which step the grain size is once again somewhat reduced to approximately an average figure of 1.6 microns, typically, + or −10%. This level of particle size allows the powder to remain in suspension in the ink product over a relatively long period. The particle size is of considerable importance in providing a successful, ceramic ink. If the particle size is too small, an undue quantity of solvent may be required, and it may also be difficult to maintain a suspension of a homogeneous nature. By contrast, if the particle size is too large, the particles will settle out under gravity, so that there is separation of the powder grains from the organic solvent materials and the binder.

Table 3 following gives the weight percentages of the powder and the organic ingredients, along with that of the zirconia cylinders, required for ball milling to give certain specified quantities of ceramic ink, also identified in the Table. The limits on the organic quantities as set forth in this Table are typically + and −1%.

TABLE 3

| Ink Volume (gal) | 3.0 | 2.5 | 2.0 | 1.5 | 1.0 | 0.5 |
|---|---|---|---|---|---|---|
| Calcined Powder (gm) | 5635 | 4695.8 | 3756.7 | 2817.5 | 1878.3 | 939 |
| Solvent (gm) | 1980 | 1650 | 1320 | 990 | 660 | 330 |
| Viscosity Modifier (gm) | 38 | 31.7 | 25.3 | 19 | 12.7 | 6.4 |
| Zirconia Cylinders (gm) | 16000 | 13300 | 10600 | 8000 | 5300 | 2700 |

The solvents, viscosity modifiers and binders used in the ceramic ink of the present invention are natural materials and offer advantages in terms of safety, having both low toxicity and high flash points. Alternative materials meeting the same criteria are not readily available in substitution for these preferred solvents, although alternative materials are nonetheless not excluded from the scope of the invention.

In the detailed preparation of ceramic ink in accordance with the foregoing specifications, as described and set forth in Table 3, the required quantities of the various ingredients are carefully weighed out and placed in the ball mill. The ball mill is preferably rotated at a speed of between 36 and 42 r.p.m for a period of approximately 24 hours. The binder is added to the ceramic ink as constituted following the ball milling step during a further mixing step. The mixed product is then stored in a sealed container so that none of the volatile organic materials are lost. Following this shear mixing, adverted to above, the ink must be left in sealed storage for at least 24 hours, after which its viscosity is measured to establish its quality and suitability for printing.

Figure 2:
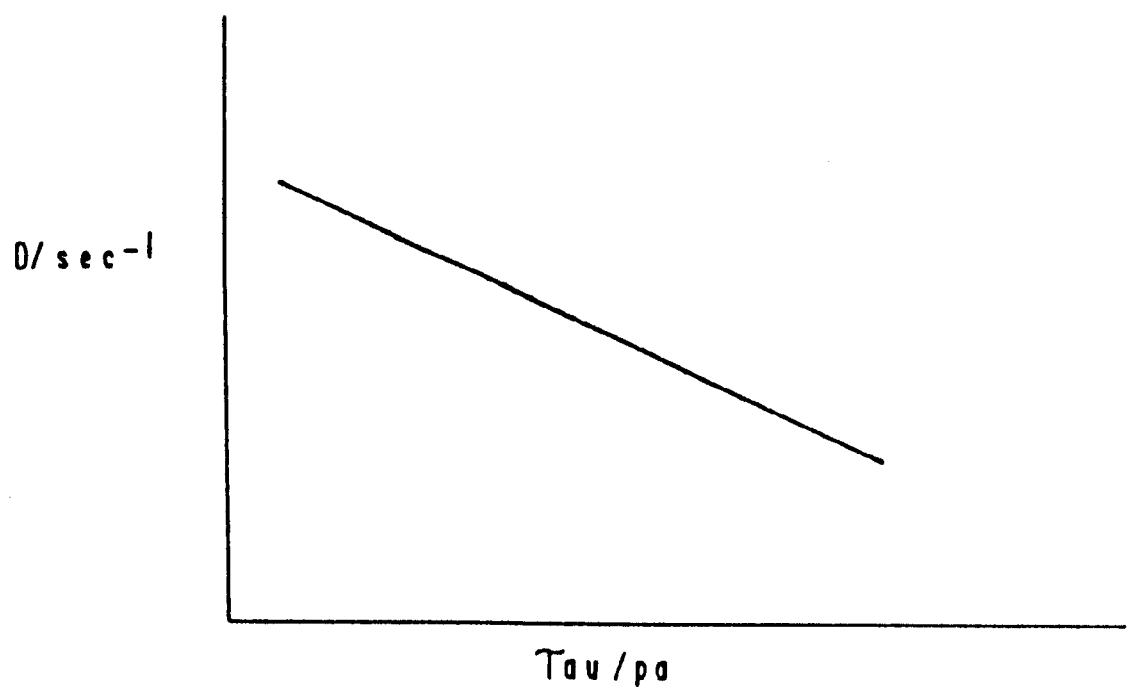
FIG. 2 is a diagram showing a plat of shear stress against shear rate for a ceramic ink according to the invention.

Viscosity is measured on any suitable viscometer such as for example a Haake viscometer. This enables a plot of shear stress against shear rate to be provided for any particular ceramic ink sample. A typical such plot is shown in FIG. 2. The plot is preferably provided with a standard "curve" or desired relationship between shear stress and shear rate, with which the figures for the sample should comply within specified predetermined limits. In the event of the shear stress performance of the sample being different from that of the standard curve, the ink may be treated to adjust its viscosity. The standard curve may also allow for changes in viscosity during shelf storage of the ceramic ink prior to its use for printing purposes.

The organic materials included in the ceramic ink serve only to enable flow and laying down of the ink in the production of multilayer ceramic varistor products. During, the subsequent firing of the formed products, all of the organic materials are volatilized leaving only the ceramic powder in a sintered structure, together with the interleaved layers of electrode material.

Although various embodiments of the invention have been described herein for purposes of illustration, they are not meant to be limiting. Variations and modifications of these embodiments of the invention may occur to those of ordinary skill in the art, which modifications are meant to be covered by the spirit and scope of the appended claims.

What is claimed is:

1. A thixotropic ink for use in manufacturing ceramic of a zinc oxide varistor, said ceramic containing zinc, oxygen and a plurality of additive elements, said ink comprising a suspension in an organic liquid of a calcined particulate material containing zinc, oxygen and a plurality of said additive elements, said calcined particulate material being formed by (a) calcining a mixture of powders of zinc oxide and said additive elements to form a calcined product having a particle size larger than particle size of said powders, and thereafter (b) reducing the particle size of said calcined product to produce said calcined particulate material;
wherein said powders have an average particle size of about 0.25 microns or less, and an average particle size of the calcined product produced by calcining is greater than 2.0 microns.

2. A composition material according to claim 1, wherein said plurality of ceramic structure influencing additives includes at least bismuth oxide, cobalt oxide and manganese oxide.

3. A composition material according to claim 1 further comprising at least one electrical performance influencing additive selected from the group consisting of at least aluminum nitrate and silver oxide.

4. A composition material according to claim 2 further comprising at least one electrical performance influencing additive selected from the group consisting of at least aluminum nitrate and silver oxide.

5. A composition material according to claim 1, comprising nickel oxide as a further additive.

6. The ink of claim 1, wherein said calcined product is mechanically worked to reduce the particle size thereof and thereby form said calcined particulate material, and further wherein the average particle size of said calcined particulate material is about 1.6 microns ±10%.

7. A composition material according to claim 1, further comprising magnesium hydroxide as an additional additive.

8. A composition material according to claim 2, further comprising magnesium hydroxide as an additional additive.

9. A composition material according to claim 3, further comprising magnesium hydroxide as an additional additive.

10. A composition material according to claim 4, further comprising magnesium hydroxide as an additional additive.

11. A composition for use in manufacturing a varistor, comprising:
94 to 98 mole percent of zinc oxide;
1 to 4 mole percent of a plurality of ceramic structure influencing additives selected from the group consisting of at least bismuth oxide, boron oxide, chromium oxide, cobalt oxide, manganese oxide and tin oxide;
0.1 to 1.6 mole percent of at least one grain growth influencing additive selected from the group consisting of at least antimony oxide, silicon dioxide and titanium dioxide;
an organic solvent carrier;
an organic viscosity influencing additive; and
an organic binder.

12. A thixotropic ink for use in manufacturing ceramic of a zinc oxide varistor, said ink comprising an organic liquid and a particulate ceramic-forming material, said ceramic-forming material being formed by calcining a spray-dried slurry of powders to thereby produce a calcined product and then mechanically reducing particle size of said calcined product to about 1.6 microns ±10%, said slurry containing:

(a) zinc oxide,
(b) at least two of bismuth oxide, boric acid, boron oxide, chromium oxide, cobalt oxide, magnesium oxide and tin oxide, and
(c) at least one of antimony oxide, silicon dioxide and titanium dioxide.

13. A coating composition for use in manufacturing a ceramic of a zinc oxide varistor, said ceramic containing zinc, oxygen and a plurality of additive elements, said ink comprising a mixture of a liquid and a calcined particulate material containing zinc, oxygen and a plurality of said additive elements, said calcined particulate material being formed by (a) calcining a mixture of powders of zinc oxide and said additive elements having an average particle size of about 0.25 micron or less to form a calcined product having a particle size larger than the particle size of said powders, and thereafter
(b) reducing the particle size of said calcined product to about 1.6 microns ±10% to produce said calcined particulate material.

* * * * *